United States Patent
Kim et al.

(10) Patent No.: US 10,423,840 B1
(45) Date of Patent: Sep. 24, 2019

(54) POST-PROCESSING METHOD AND DEVICE FOR DETECTING LANES TO PLAN THE DRIVE PATH OF AUTONOMOUS VEHICLE BY USING SEGMENTATION SCORE MAP AND CLUSTERING MAP

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Geongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

(*) Notice: Subject to any disclaimer, the term of this patent is extended or adjusted under 35 U.S.C. 154(b) by 0 days.

(21) Appl. No.: 16/263,168

(22) Filed: Jan. 31, 2019

(51) Int. Cl.
| | |
|---|---|
| *G06K 9/00* | (2006.01) |
| *G06T 7/73* | (2017.01) |
| *G06K 9/62* | (2006.01) |
| *G08G 1/04* | (2006.01) |
| *G08G 1/16* | (2006.01) |

(52) U.S. Cl.
CPC ....... *G06K 9/00798* (2013.01); *G06K 9/6218* (2013.01); *G06T 7/73* (2017.01);
(Continued)

(58) Field of Classification Search
CPC .. G06K 9/00798; G06K 9/6218; G08G 1/167; G08G 1/04; G06T 7/73;
(Continued)

(56) References Cited

U.S. PATENT DOCUMENTS

| | | | | |
|---|---|---|---|---|
| 10,223,614 B1 * | 3/2019 | Kim | ............ | G06K 9/6262 |
| 10,229,346 B1 * | 3/2019 | Kim | ............ | G06K 9/6262 |

(Continued)

OTHER PUBLICATIONS

Badrinarayanan et al., SegNet: A Deep Convolutional Encoder-Decoder Architecture for Image Segmentation, IEEE Transactions on Pattern Analysis and Machine Intelligence, Dec. 2017.*
(Continued)

*Primary Examiner* — John B Strege
(74) *Attorney, Agent, or Firm* — Husch Blackwell LLP

(57) ABSTRACT

A post-processing method for detecting lanes to plan the drive path of an autonomous vehicle by using a segmentation score map and a clustering map is provided. The method includes steps of: a computing device acquiring the segmentation score map and the clustering map from a CNN; instructing a post-processing module to detect lane elements including pixels forming the lanes referring to the segmentation score map and generate seed information referring to the lane elements, the segmentation score map, and the clustering map; instructing the post-processing module to generate base models referring to the seed information and generate lane anchors referring to the base models; instructing the post-processing module to generate lane blobs referring to the lane anchors; and instructing the post-processing module to detect lane candidates referring to the lane blobs and generate a lane model by line-fitting operations on the lane candidates.

28 Claims, 6 Drawing Sheets
(4 of 6 Drawing Sheet(s) Filed in Color)

(52) U.S. Cl.
CPC .............. *G08G 1/04* (2013.01); *G08G 1/167* (2013.01); *G06T 2207/10016* (2013.01); *G06T 2207/20084* (2013.01); *G06T 2207/30256* (2013.01)

(58) Field of Classification Search
CPC . G06T 2207/10016; G06T 2207/30256; G06T 2207/20084
See application file for complete search history.

(56) References Cited

U.S. PATENT DOCUMENTS

| | | | | |
|---|---|---|---|---|
| 2015/0310277 | A1* | 10/2015 | Schertler | G06K 9/0063 382/128 |
| 2017/0011281 | A1* | 1/2017 | Dijkman | G06K 9/66 |
| 2017/0124415 | A1* | 5/2017 | Choi | G06N 3/08 |
| 2018/0181817 | A1* | 6/2018 | Yan | G06N 3/02 |
| 2018/0283892 | A1* | 10/2018 | Behrendt | G01C 21/3673 |
| 2018/0285659 | A1* | 10/2018 | Kwant | G06K 9/00798 |
| 2019/0012548 | A1* | 1/2019 | Levi | G06K 9/00791 |

OTHER PUBLICATIONS

Sun et al., Face detection using deep learning: an improved faster RCNN approach, Elsevier B.V., Mar. 2018.*
Ren et al., Faster R-CNN: Towards Real-Time Object Detection with Region Proposal Networks, 2015.*
Du et al., Fused DNN: A deep neural network fusion approach to fast and robust pedestrian detection, IEEE, 2017.*
Girshick et al., Fast R-CNN, 2015.*

* cited by examiner

POST-PROCESSING METHOD AND DEVICE FOR DETECTING LANES TO PLAN THE DRIVE PATH OF AUTONOMOUS VEHICLE BY USING SEGMENTATION SCORE MAP AND CLUSTERING MAP

FIELD OF THE DISCLOSURE

The present disclosure relates to a post-processing method and a device for use with an autonomous vehicle; and more particularly, to the post-processing method and the device for detecting lanes to plan the drive path of an autonomous vehicle.

BACKGROUND OF THE DISCLOSURE

Deep Convolution Neural Networks (Deep CNNs) are the heart of the remarkable development in deep learning. CNNs have already been used in the 90's to solve the problem of character recognition, but their use has become as widespread as it is now thanks to recent research. These deep CNNs won the 2012 ImageNet image classification tournament, crushing other competitors. Then, the convolution neural network became a very useful tool in the field of the machine learning.

A post-processing is a job which applies a predetermined adjustment to a result outputted from a deep CNN in order to obtain a user-desired result additionally.

Recently, the post-processing is frequently used in the deep CNNs. The CNN plays several roles in an autonomous driving module. One of such roles is to detect one or more lanes in an input image. By detecting the lanes, a free space for vehicles to drive through may be detected, or vehicles may be appropriately controlled to drive on the center of a road.

However, if the result only from the deep CNNs is used, the performance of lane detection is not very useful. Hence, the lane detection is often achieved by post-processing the result from the deep CNNs, but, once again, if a segmentation score map alone generated in the deep CNNs is used, the performance of the post-processing is poor.

SUMMARY OF THE DISCLOSURE

It is an object of the present disclosure to solve all the aforementioned problems.

It is another object of the present disclosure to allow a smooth post-processing for lane detection by using a clustering map together with a segmentation score map.

It is still another object of the present disclosure to perform an optimized lane detection by using lane elements, lane anchors, and lane blobs which are drawn by referring to the segmentation score map and the clustering map.

In accordance with one aspect of the present disclosure, there is provided a post-processing method for detecting one or more lanes by using a segmentation score map and a clustering map, including steps of: (a) a computing device acquiring the segmentation score map and the clustering map generated by a convolutional neural network (CNN) from an input image; (b) the computing device instructing a post-processing module capable of performing a data processing at a backend of the CNN, (i) to detect lane elements which are unit areas including pixels forming the lanes on the input image by referring to the segmentation score map and (ii) to generate seed information by referring to the lane elements, the segmentation score map, and the clustering map; (c) the computing device instructing the post-processing module to generate one or more base models corresponding to each of the lanes by referring to the seed information and generate one or more lane anchors by referring to the base models; (d) the computing device instructing the post-processing module to generate one or more lane blobs including at least one set of the lane elements by referring to the lane anchors; and (e) the computing device instructing the post-processing module to (i) detect one or more lane candidates within the input image by referring to the lane blobs and (ii) generate at least one lane model by applying at least one line-fitting operation to the lane candidates to thereby detect the lanes.

As one example, before the step of (a), the CNN applies at least one convolution operation and at least one deconvolution operation to the input image, to thereby generate the segmentation score map, and applies a neural network operation to the segmentation score map such that (i) each of inter-class differences among each of values, included in the segmentation score map, corresponding to pixels of the respective lanes included in the input image is increased and (ii) each of intra-class variances of the values, included in the segmentation score map, corresponding to pixels included in the respective lanes included in the input image is decreased.

As one example, at the step of (b), the post-processing module generates the seed information by using (i) center coordinates corresponding to locations of the lane elements on the input image, (ii) widths of the lane elements, (iii) representative values, on the segmentation score map, of pixels included in the lane elements, and (iv) the clustering map, wherein the seed information includes at least one of clustering id values indicating at least one lane to which the lane elements belong.

As one example, at the step of (c), the post-processing module determines, as one of the lane anchors, a specific base model represented by a certain formula which approximately fits a straight line among the base models, wherein the certain formula is derived by referring to the center coordinates of the lane elements.

As one example, at the step of (c), the post-processing module determines a specific base model as one of the lane anchors, wherein the specific base model is selected among the base models by referring to specific lane elements (i) whose representative values on the segmentation score map are equal to or greater than a predetermined threshold value and (ii) whose clustering id values obtained by using the clustering map are similar.

As one example, at the step of (c), the post-processing module determines a specific base model as one of the lane anchors, wherein the specific base model is selected among the base models by referring to specific lane elements having the smallest variances of clustering id values on the seed information.

As one example, at the step of (d), the post-processing module traces and groups each of specific lane elements adjacent to each of the lane anchors, to thereby generate the lane blobs.

As one example, the post-processing module traces and groups each of the specific lane elements adjacent to each of the lane anchors by referring to each of clustering id values, each of representative values, and each of widths on the seed information, corresponding to each of the lane anchors, to thereby generate the lane blobs.

As one example, the post-processing module traces and groups the specific lane elements per each of the lane anchors bi-directionally along each of the lane anchors, to thereby generate the lane blobs.

As one example, at the step of (e), the post-processing module (i) searches for and adds specific pixels, not included in the lane elements, among the pixels adjacent to the lane blobs, to thereby extend the lane blobs, and (ii) merges the extended lane blobs to thereby detect the lane candidates.

As one example, at the step of (e), the post-processing module merges the lane blobs whose directionalities therebetween coincide with each other and clustering id values are within a predetermined range, to thereby detect the lane candidates.

As one example, at the step of (e), if each directionality of each of the lane blobs and that of each of misunderstood groups are similar but each of corresponding clustering id values of each of the lane blobs and that of each of the misunderstood groups are not within a predetermined range, the post-processing module removes part having a lower average of values on the segmentation score map among the lane blobs and the misunderstood groups.

As one example, at the step of (e), the line-fitting operation is an operation capable of outputting a polynomial model by polynomial fitting using a relation among center coordinates of the lane elements included in each of the lanes.

As one example, at the step of (e), the line-fitting operation is an operation capable of outputting a spline model by selecting center locations of specific lane anchors with less errors during the tracing process, among the lane anchors, as key points of a spline.

In accordance with another aspect of the present disclosure, there is provided a computing device for detecting one or more lanes by using a segmentation score map and a clustering map, including: at least one memory that stores instructions; and at least one processor configured to execute the instructions to: perform processes of (I), if the segmentation score map and the clustering map are generated by a convolutional neural network (CNN) from an input image, instructing a post-processing module capable of performing a data processing at a backend of the CNN, (i) to detect lane elements which are unit areas including pixels forming the lanes on the input image by referring to the segmentation score map and (ii) to generate seed information by referring to the lane elements, the segmentation score map, and the clustering map, (II) instructing the post-processing module to generate one or more base models corresponding to each of the lanes by referring to the seed information and generate one or more lane anchors by referring to the base models, (III) instructing the post-processing module to generate one or more lane blobs including at least one set of the lane elements by referring to the lane anchors, and (IV) instructing the post-processing module to (i) detect one or more lane candidates within the input image by referring to the lane blobs and (ii) generate at least one lane model by applying at least one line-fitting operation to the lane candidates to thereby detect the lanes.

As one example, before the segmentation score map and the clustering map are acquired, the CNN applies at least one convolution operation and at least one deconvolution operation to the input image, to thereby generate the segmentation score map, and applies a neural network operation to the segmentation score map such that (i) each of inter-class differences among each of values, included in the segmentation score map, corresponding to pixels of the respective lanes included in the input image is increased and (ii) each of intra-class variances of the values, included in the segmentation score map, corresponding to pixels included in the respective lanes included in the input image is decreased.

As one example, at the process of (I), the post-processing module generates the seed information by using (i) center coordinates corresponding to locations of the lane elements on the input image, (ii) widths of the lane elements, (iii) representative values, on the segmentation score map, of pixels included in the lane elements, and (iv) the clustering map, wherein the seed information includes at least one of clustering id values indicating at least one lane to which the lane elements belong.

As one example, at the process of (II), the post-processing module determines, as one of the lane anchors, a specific base model represented by a certain formula which approximately fits a straight line among the base models, wherein the certain formula is derived by referring to the center coordinates of the lane elements.

As one example, at the process of (II), the post-processing module determines a specific base model as one of the lane anchors, wherein the specific base model is selected among the base models by referring to specific lane elements (i) whose representative values on the segmentation score map are equal to or greater than a predetermined threshold value and (ii) whose clustering id values obtained by using the clustering map are similar.

As one example, at the process of (II), the post-processing module determines a specific base model as one of the lane anchors, wherein the specific base model is selected among the base models by referring to specific lane elements having the smallest variances of clustering id values on the seed information.

As one example, at the process of (III), the post-processing module traces and groups each of specific lane elements adjacent to each of the lane anchors, to thereby generate the lane blobs.

As one example, the post-processing module traces and groups each of the specific lane elements adjacent to each of the lane anchors by referring to each of clustering id values, each of representative values, and each of widths on the seed information, corresponding to each of the lane anchors, to thereby generate the lane blobs.

As one example, the post-processing module traces and groups the specific lane elements per each of the lane anchors bi-directionally along each of the lane anchors, to thereby generate the lane blobs.

As one example, at the process of (IV), the post-processing module (i) searches for and adds specific pixels, not included in the lane elements, among the pixels adjacent to the lane blobs, to thereby extend the lane blobs, and (ii) merges the extended lane blobs to thereby detect the lane candidates.

As one example, at the process of (IV), the post-processing module merges the lane blobs whose directionalities therebetween coincide with each other and clustering id values are within a predetermined range, to thereby detect the lane candidates.

As one example, at the process of (IV), if each directionality of each of the lane blobs and that of each of misunderstood groups are similar but each of corresponding clustering id values of each of the lane blobs and that of each of the misunderstood groups are not within a predetermined range, the post-processing module removes part having a lower average of values on the segmentation score map among the lane blobs and the misunderstood groups.

As one example, at the process of (IV), the line-fitting operation is an operation capable of outputting a polynomial model by polynomial fitting using a relation among center coordinates of the lane elements included in each of the lanes.

As one example, at the process of (IV), the line-fitting operation is an operation capable of outputting a spline model by selecting center locations of specific lane anchors with less errors during the tracing process, among the lane anchors, as key points of a spline.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects and features of the present disclosure will become apparent from the following description of preferred embodiments given in conjunction with the accompanying drawings, in which:

The following drawings to be used to explain example embodiments of the present disclosure are only part of example embodiments of the present disclosure and other drawings can be obtained based on the drawings by those skilled in the art of the present disclosure without inventive work.

Figure 1:
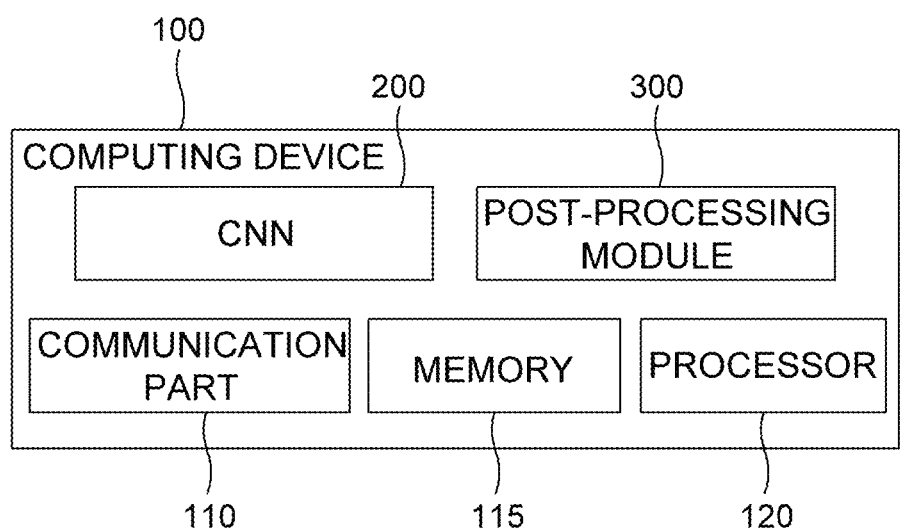

FIG. 1 is a drawing illustrating a configuration of a computing device capable of performing a post-processing method for detecting lanes by using a segmentation score map and a clustering map in accordance with the present disclosure.

Figure 2:
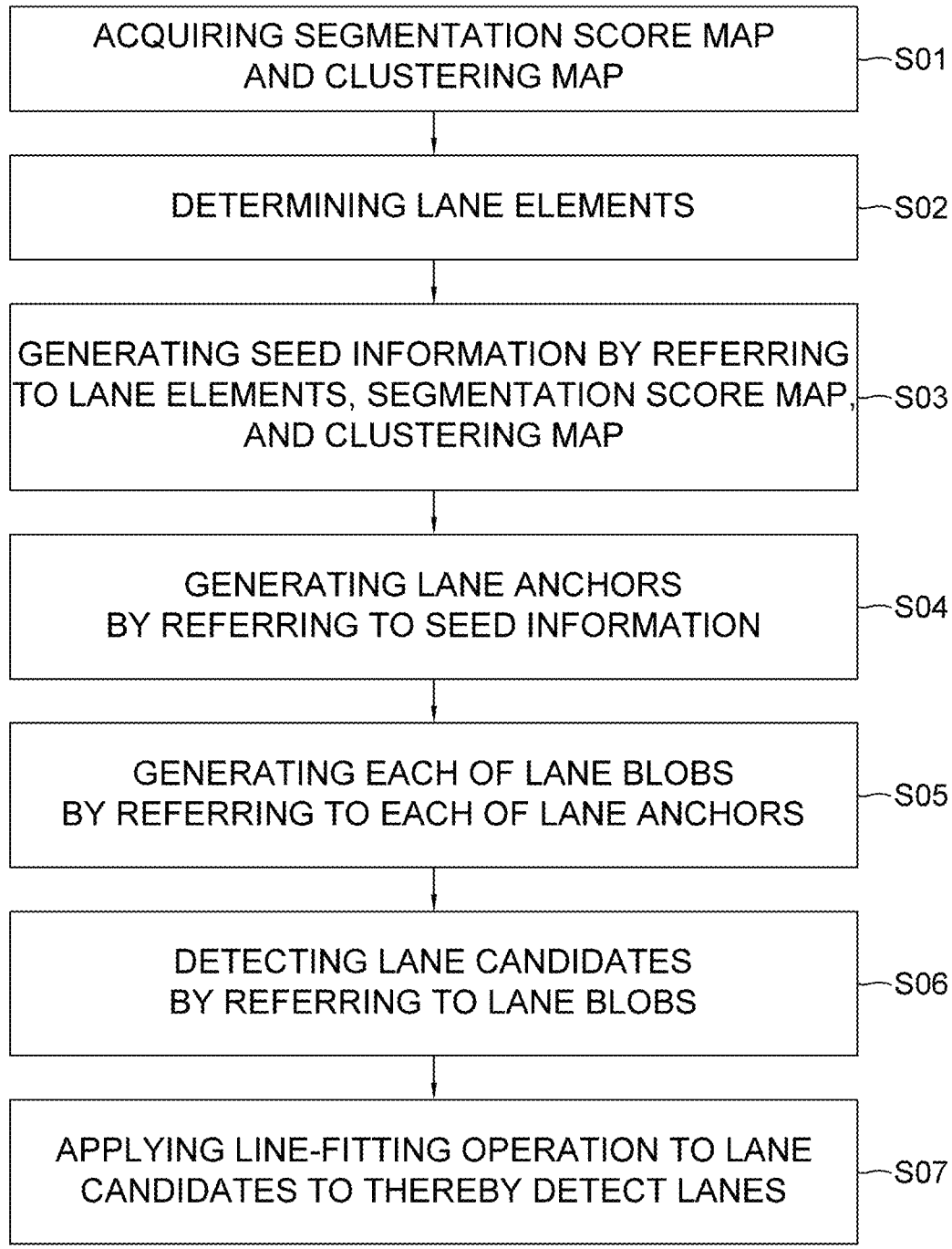

FIG. 2 is a flowchart illustrating a flow of the post-processing method in accordance with one example embodiment of the present disclosure.

Figure 3:
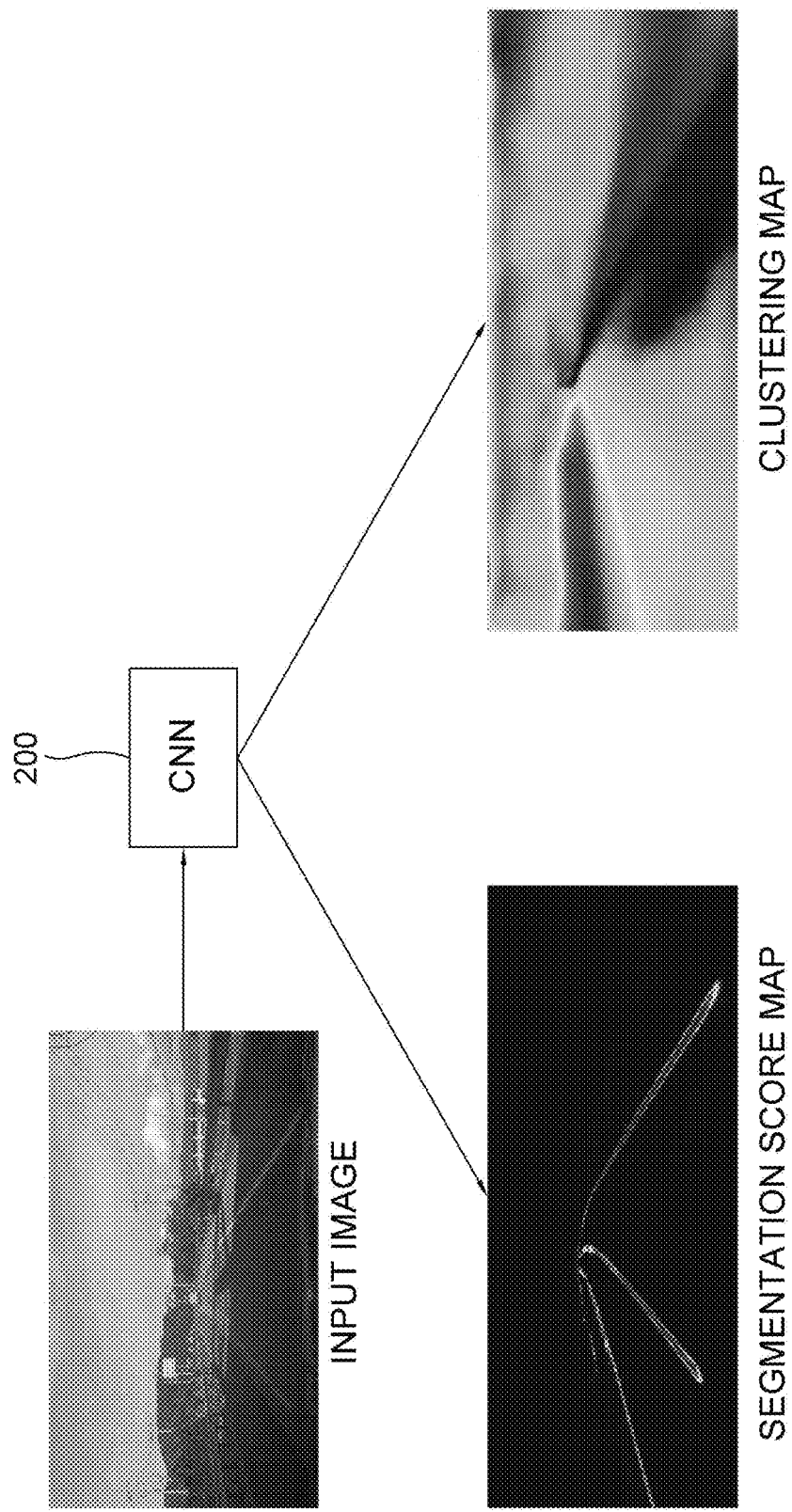

FIG. 3 is a drawing illustrating the segmentation score map and the clustering map which may be used by a post-processing module in accordance with one example embodiment of the present disclosure.

Figure 4:

FIG. 4 is a drawing illustrating lane elements in accordance with one example embodiment of the present disclosure.

Figure 5:
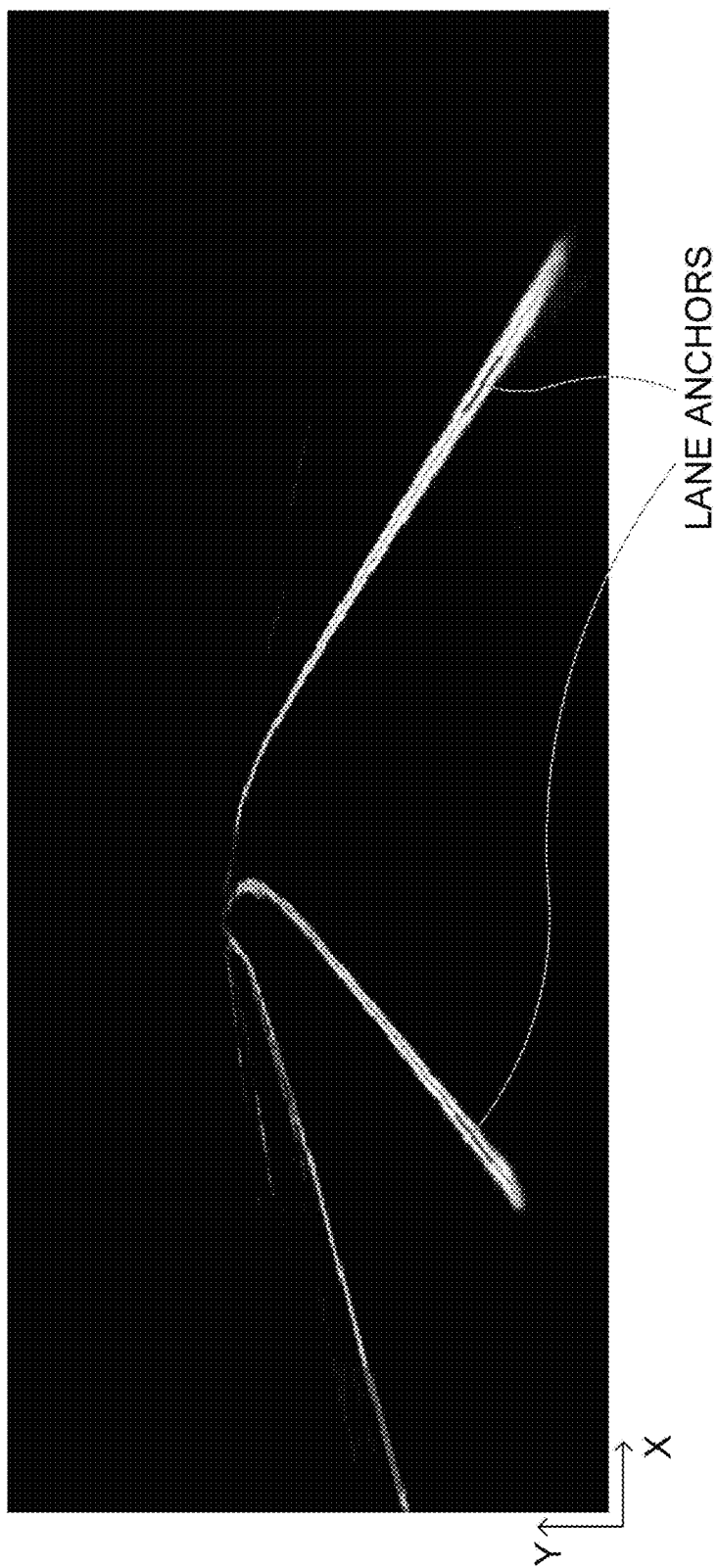

FIG. 5 is a drawing illustrating lane anchors in accordance with one example embodiment of the present disclosure.

Figure 6:
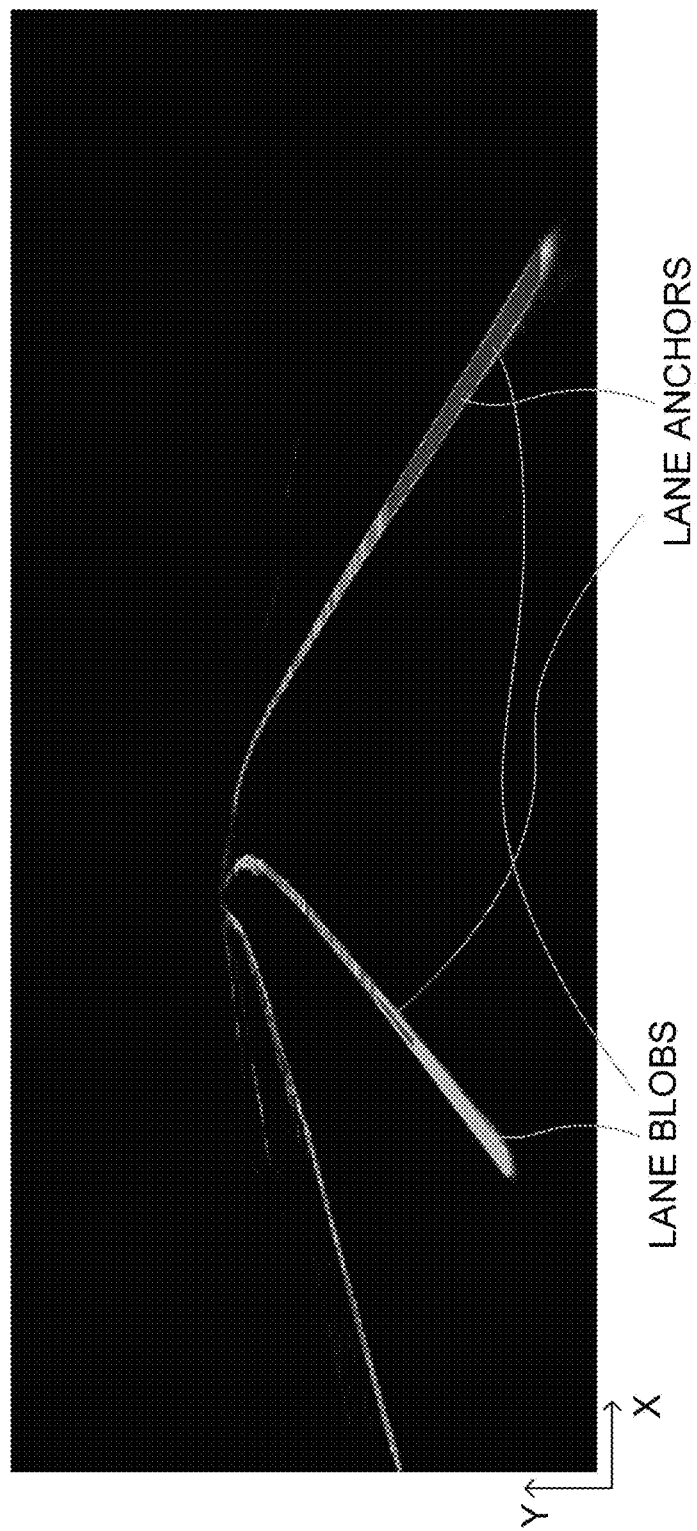

FIG. 6 is a drawing illustrating lane blobs in accordance with one example embodiment of the present disclosure.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

Throughout the present disclosure, every processor, every memory, every storage, or any other computing components are described as separate components, however, said every processor, said every memory, said every storage, or said any other computing components may be configured as a single device or any other combinations thereof.

FIG. 1 is a drawing illustrating a configuration of a computing device capable of performing a post-processing method for detecting lanes by using a segmentation score map and a clustering map of the present disclosure.

Referring to FIG. 1, the computing device 100 may include a convolutional neural network (CNN) 200 and a post-processing module 300. The computation processes of the CNN 200 and the post-processing module 300 may be performed by a communication part 110 and a processor 120. In FIG. 1, however, a detailed connection between the communication part 110 and the processor 120 is omitted. In addition the computing device may further include a memory 115 capable of storing computer readable instructions for performing following processes. As one example, the processor, the memory, a medium, etc. may be integrated with an integrated processor.

The configuration of the computing device capable of performing the post-processing method for detecting lanes by using the segmentation score map and the clustering map of the present disclosure has been described above. Hereinafter, the post-processing method of the present disclosure will be described by referring to FIG. 2.

FIG. 2 is a flowchart illustrating a flow of the post-processing method in accordance with one example embodiment of the present disclosure.

Referring to FIG. 2, if the segmentation score map and the clustering map are generated from an input image by the CNN 200, the post-processing module 300 may acquire the segmentation score map and the clustering map at a step of S01. The post-processing module 300 detects lane elements at a step of S02 and generates seed information by referring to the lane elements, the segmentation score map, and the clustering map at a step of S03. Thereafter, the post-processing module 300 may generate lane anchors by referring to the seed information at a step of S04 and generate each of lane blobs by referring to each of the lane anchors at a step of S05. Lastly, the post-processing module 300 may detect lane candidates by referring to the lane blobs at a step of S06 and may apply at least one line-fitting operation to the lane candidates to thereby detect the lanes at a step of S07.

The post-processing method in accordance with one example embodiment of the present disclosure illustrated in FIG. 2 will be described in more detail below.

First of all, if the segmentation score map and the clustering map are generated from the input image by the CNN 200, the communication part 110 included in the computing device 100 acquires the segmentation score map and the clustering map, and the segmentation score map and the clustering map are transmitted to the post-processing module 300. The process of generating the segmentation score map and the clustering map will be described by referring to FIG. 3.

FIG. 3 is a drawing illustrating the segmentation score map and the clustering map which may be used by the post-processing module in accordance with one example embodiment of the present disclosure.

Referring to FIG. 3, it is seen that segmentation scores are distributed in the segmentation score map in a manner that distinguishes the lanes from non-lane portions on the input image. Herein, the segmentation score map is actually formed of numbers, but in FIG. 3, different colors have been used according to the size of the number in order to visualize the segmentation score map. However, although the lanes can be distinguished from the non-lane portions by referring only to the segmentation score map, but since it is not possible to determine whether respective pixels, determined as belonging to the lanes, belong to the same lane or different lanes, thus the clustering map is used together, in which each of the values on the clustering map represents whether each of the pixels is included in a same cluster or a different cluster. Referring to FIG. 3 again, when compared with the input image, each of a left lane, a middle lane, and a right lane belongs to each of distinguished areas, and values within the same area are similar to each other. Hence, the areas corresponding to the same lane in FIG. 3 exhibit similar colors. Likewise, the post-processing module 300 may detect the lanes by using two maps drawn from the CNN.

Herein, the CNN 200 applies at least one convolution operation and at least one deconvolution operation to the input image, to thereby generate the segmentation score map, and applies a neural network operation to the segmentation score map such that (i) each of inter-class differences among each of values, included in the segmentation score map, corresponding to pixels of the respective lanes included in the input image is increased and (ii) each of intra-class variances of the values, included in the segmentation score map, corresponding to pixels included in the respective lanes included in the input image, to thereby generate a clustering map is decreased.

As a premise for describing how the computing device 100 instructs the post-processing module 300 to use the segmentation score map and the clustering map according to the above processes, it will be described below how the lane elements are defined by referring to FIG. 4.

FIG. 4 is a drawing illustrating the lane elements in accordance with one example embodiment of the present disclosure.

Referring to FIG. 4, the lane elements are unit areas including pixels forming the lanes on the input image. The lane elements may be each of unit areas where lanes on the input image are cut along X-axis direction while changing the locations on the Y-axis, but the scope of the present disclosure is not limited thereto. Hereinafter, the description will assume that the lane elements are unit areas which are cut along the X-axis while having a one-pixel width in the Y-axis direction similarly to FIG. 4.

The post-processing module 300 may detect pixels with values greater than neighboring values on the segmentation score map as lane candidate areas and may detect results, which are generated by cutting the lane candidate areas along the X-axis per pixel arranged in the Y-axis direction, as the lane elements.

If the lane elements are detected, the post-processing module 300 generates each piece of the seed information corresponding to each of the lane elements by using the lane elements and the clustering map, which will be described below in detail.

The post-processing module 300 may (i) detect coordinates at both ends of each of the lane elements, and calculate the coordinates of the pixel located in the center by using said coordinates at both ends, (ii) calculate the horizontal width of each of the lane elements by using the detected coordinates at both ends, (iii) determine each of largest values, among the values on the segmentation score map corresponding to the pixels included in each of the lane elements, as each of representative values of each of the lane elements, and (iv) acquire each of the clustering id values representing to which of the lanes each of the lane elements belongs by using the clustering map. Each of the clustering id values may be a value on the clustering map corresponding to the center coordinates or a value on the clustering map corresponding to the pixel for the representative value, but the scope of the present disclosure is not limited to this example. That is, the post-processing module 300 generates the seed information including (i) the center coordinates, (ii) the widths of the lane elements, (iii) the representative values, and (iv) the clustering id values, corresponding to each of the lane elements.

If the seed information is generated by the post-processing module 300, the computing device 100 instructs the post-processing module 300 to detect a lane anchor per lane by referring to the seed information.

The lane anchor is a specific base model which has the strongest characteristics of a lane among the base models. It means having the most lane-like characteristic to be described later. Herein, the lane will be detected by applying one or more operations, such as merging operation, etc., to the lane elements based on the lane anchor, and thus the specific base model with the most lane-like characteristic is determined as the lane anchor. In order to find out the specific base model, one or more base models are generated per lane by referring to the seed information, and then the specific base model, which is expected as having least errors when a lane is drawn based on the specific base model, is determined as the lane anchor.

The methods of determining the lane anchors by the post-processing module 300 will be described below.

The post-processing module 300 may draw a mathematical relation among the center coordinates of the lane elements and generate the base models accordingly. The post-processing module 300 may determine, as the lane anchor, the specific base model represented by a certain formula which approximately fits a straight line among the base models, where the certain formula is derived by referring to the center coordinates of the lane elements. For example, the certain formula may best fit the straight line.

That is, if the lane elements form a uniform group to the point where the certain formula represents a straight line, then the lane detection based on the specific base model is expected to deliver a good performance, thus the specific base model is determined as the lane anchor. One example of such the lane anchor is described by referring to FIG. 5.

FIG. 5 is a drawing illustrating the lane anchors in accordance with one example embodiment of the present disclosure.

Referring to FIG. 5, it is seen that at least one specific base model corresponding to portions approximately fitting a straight line in each of the lanes is determined as at least one of the lane anchors. Likewise, each of the lane blobs is generated by using each of the determined lane anchors, and then the lanes are detected by applying operations like adding pixels to the lane blobs. Since the lane anchor becomes the basis of the lane detection, the model with the strongest lane-like characteristic should be selected.

As mentioned above, it is also possible to determine the lane anchor based on the linearity of graphs corresponding to the central coordinates of the lane elements, and as another example, the lane anchor may be determined by using the representative values of the lane elements.

That is, the post-processing module 300 may determine the lane anchor by referring to lane elements whose representative values, included in the seed information corresponding to each of the lane elements, are equal to or greater than a predetermined threshold value and whose clustering id values included in the seed information are similar to each other.

Each of the values on the segmentation score map indicates the probability of each pixel on the input image being determined as part of a lane by the CNN 200. Herein, if each of the values is high, it means that there is a high chance that the pixel is part of the lane. Hence, if the lane is detected based on the specific base model corresponding to the lane elements whose representative values are greater than a predetermined threshold, a good result is expected, and thus the lane anchor may be determined in such a manner. The condition that the clustering id values are similar to each other is a condition that may be required, as the clustering id values are used for distinguishing each of the lane anchors per each of the lanes, from each other.

Further, it may be possible to generate the lane anchor by using the clustering id values. Namely, the post-processing module 300 may determine the lane anchor by referring to lane elements with the smallest variance of the clustering id values corresponding to each of the lane elements.

The values on the clustering map indicate to which group each of the pixels belongs. Herein, if the variance between the values is small, it is determined that there is a high probability that the pixels corresponding to the values with a small variance are part of the same lane. As such, if a lane is detected based on the base model corresponding to the lane elements with the smallest variance of the clustering id values on the seed information, a good result is expected, and thus the lane anchor may be determined in this way.

If the lane anchor is determined according to the above methods, the post-processing module 300 generates the lane blobs corresponding to a set of lane elements adjacent to the lane anchor. The lane blobs will be described by referring to FIG. 6.

FIG. 6 is a drawing illustrating the lane blobs in accordance with one example embodiment of the present disclosure.

Referring to FIG. 6, each of the lane blobs is generated by tracing and grouping lane elements adjacent to each of the lane anchors. Specifically, the post-processing module 300 determines whether to include the lane elements in the lane blobs by referring to the distribution of clustering id values on the seed information corresponding to the lane elements near each of the lane anchors, the distribution of representative values, and the width of the horizontal axis. If a specific lane element is included in the lane blobs, the post-processing module 300 updates the lane anchor by using the newly added specific lane elements, and repeats such a process bi-directionally along the lane anchor of each lane, thereby extending the lane blob.

If the lane blobs are generated in the above method, the post-processing module 300 detects the lane candidates within the input image by referring to the generated lane blobs and generates at least one lane model by applying the line-fitting operation to the detected lane candidates to thereby detect the lanes.

Specifically, first of all, the post-processing module 300 extends the lane blobs by searching for and adding pixels included in the lanes but not included in the lane elements among pixels adjacent to the lane blobs, merges the extended lane blobs, and removes lane blobs having a low probability of being a lane among the redundant lane blobs.

The process of merging the lane blobs is as follows. The post-processing module 300 merges the lane blobs whose directionalities therebetween coincide with each other and whose clustering id values are within a predetermined range, to thereby detect the lane candidates because such lane blobs are determined as being part of the same lane.

The process of removing the lane blobs is as follows. If each directionality of each of the lane blobs and that of each of misunderstood groups are similar but each of corresponding clustering id values of each of the lane blobs and that of each of the misunderstood groups are not within a predetermined range, the post-processing module 300 removes part having a lower average of values on the segmentation score map among the lane blobs and the misunderstood groups.

In the above processes of merging and removing the lane blobs, whether the clustering id values are similar is determined by confirming if each of the clustering id values is within each of predetermined ranges.

If the lane candidates for each of the lanes are detected through the above process, the lane model is generated by applying the line-fitting operation to the lane candidates, to thereby finally detect the lanes. Various methods may be used as the line-fitting operation. For example, methods of using the polynomial fitting or a spline curve may be applied.

If the polynomial fitting is used, the line fitting for the lane is performed by using a polynomial indicating a relationship between each of first components and each of second components of the center coordinates of the lane elements included in the lane candidates, then a lane model as a result is generated to thereby detect the lanes.

If the spline curve is used, the lane model is generated by generating polynomial models by selecting center locations of anchors with small errors as key points of the spline among the lane anchors, to thereby detect the lanes.

The present disclosure has an effect of allowing a smooth post-processing for the lane detection by using the clustering map together with the segmentation score map.

The present disclosure has another effect of allowing the optimized lane detection by using the lane elements, the lane anchors, the lane blobs, etc. which are drawn based on the segmentation score map and the clustering map.

By detecting the lanes in accordance with the present disclosure, the drive path may be optimized for an autonomous vehicle.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A post-processing method for detecting one or more lanes by using a segmentation score map and a clustering map, comprising steps of:
    (a) a computing device acquiring the segmentation score map and the clustering map generated by a convolutional neural network (CNN) from an input image;
    (b) the computing device instructing a post-processing module capable of performing a data processing at a backend of the CNN, (i) to detect lane elements which are unit areas including pixels forming the lanes on the input image by referring to the segmentation score map and (ii) to generate seed information by referring to the lane elements, the segmentation score map, and the clustering map;
    (c) the computing device instructing the post-processing module to generate one or more base models corresponding to each of the lanes by referring to the seed information and generate one or more lane anchors by referring to the base models;
    (d) the computing device instructing the post-processing module to generate one or more lane blobs including at least one set of the lane elements by referring to the lane anchors; and
    (e) the computing device instructing the post-processing module to (i) detect one or more lane candidates within the input image by referring to the lane blobs and (ii) generate at least one lane model by applying at least one line-fitting operation to the lane candidates to thereby detect the lanes.

2. The post-processing method of claim 1, wherein, before the step of (a), the CNN applies at least one convolution operation and at least one deconvolution operation to the input image, to thereby generate the segmentation score map, and applies a neural network operation to the segmentation score map such that (i) each of inter-class differences among each of values, included in the segmentation score map, corresponding to pixels of the respective lanes included in the input image is increased and (ii) each of intra-class variances of the values, included in the segmentation score map, corresponding to pixels included in the respective lanes included in the input image is decreased.

3. The post-processing method of claim 1, wherein, at the step of (b), the post-processing module generates the seed information by using (i) center coordinates corresponding to locations of the lane elements on the input image, (ii) widths of the lane elements, (iii) representative values, on the segmentation score map, of pixels included in the lane elements, and (iv) the clustering map, and
    wherein the seed information includes at least one of clustering id values indicating at least one lane to which the lane elements belong.

4. The post-processing method of claim 1, wherein, at the step of (c), the post-processing module determines, as one of the lane anchors, a specific base model represented by a certain formula which approximately fits a straight line among the base models, wherein the certain formula is derived by referring to the center coordinates of the lane elements.

5. The post-processing method of claim 1, wherein, at the step of (c), the post-processing module determines a specific base model as one of the lane anchors, wherein the specific base model is selected among the base models by referring to specific lane elements (i) whose representative values on the segmentation score map are equal to or greater than a predetermined threshold value and (ii) whose clustering id values obtained by using the clustering map are similar.

6. The post-processing method of claim 1, wherein, at the step of (c), the post-processing module determines a specific base model as one of the lane anchors, wherein the specific base model is selected among the base models by referring to specific lane elements having the smallest variances of clustering id values on the seed information.

7. The post-processing method of claim 1, wherein, at the step of (d), the post-processing module traces and groups each of specific lane elements adjacent to each of the lane anchors, to thereby generate the lane blobs.

8. The post-processing method of claim 7, wherein the post-processing module traces and groups each of the specific lane elements adjacent to each of the lane anchors by referring to each of clustering id values, each of representative values, and each of widths on the seed information, corresponding to each of the lane anchors, to thereby generate the lane blobs.

9. The post-processing method of claim 8, wherein the post-processing module traces and groups the specific lane elements per each of the lane anchors bi-directionally along each of the lane anchors, to thereby generate the lane blobs.

10. The post-processing method of claim 1, wherein, at the step of (e), the post-processing module (i) searches for and adds specific pixels, not included in the lane elements, among the pixels adjacent to the lane blobs, to thereby extend the lane blobs, and (ii) merges the extended lane blobs to thereby detect the lane candidates.

11. The post-processing method of claim 1, wherein, at the step of (e), the post-processing module merges the lane blobs whose directionalities therebetween coincide with each other and clustering id values are within a predetermined range, to thereby detect the lane candidates.

12. The post-processing method of claim 1, wherein, at the step of (e), if each directionality of each of the lane blobs and that of each of misunderstood groups are similar but each of corresponding clustering id values of each of the lane blobs and that of each of the misunderstood groups are not within a predetermined range, the post-processing module removes part having a lower average of values on the segmentation score map among the lane blobs and the misunderstood groups.

13. The post-processing module method of claim 1, wherein, at the step of (e), the line-fitting operation is an operation capable of outputting a polynomial model by polynomial fitting using a relation among center coordinates of the lane elements included in each of the lanes.

14. The post-processing module method of claim 1, wherein, at the step of (e), the line-fitting operation is an operation capable of outputting a spline model by selecting center locations of specific lane anchors with less errors during the tracing process, among the lane anchors, as key points of a spline.

15. A computing device for detecting one or more lanes by using a segmentation score map and a clustering map, comprising:
at least one memory that stores instructions; and
at least one processor configured to execute the instructions to: perform processes of (I) if the segmentation score map and the clustering map are generated by a convolutional neural network (CNN) from an input image, instructing a post-processing module capable of performing a data processing at a backend of the CNN, (i) to detect lane elements which are unit areas including pixels forming the lanes on the input image by referring to the segmentation score map and (ii) to generate seed information by referring to the lane elements, the segmentation score map, and the clustering map, (II) instructing the post-processing module to generate one or more base models corresponding to each of the lanes by referring to the seed information and generate one or more lane anchors by referring to the base models, (III) instructing the post-processing module to generate one or more lane blobs including at least one set of the lane elements by referring to the lane anchors, and (IV) instructing the post-processing module to (i) detect one or more lane candidates within the input image by referring to the lane blobs and (ii) generate at least one lane model by applying at least one line-fitting operation to the lane candidates to thereby detect the lanes.

16. The computing device of claim 15, wherein, before the segmentation score map and the clustering map are acquired, the CNN applies at least one convolution operation and at least one deconvolution operation to the input image, to thereby generate the segmentation score map, and applies a neural network operation to the segmentation score map such that (i) each of inter-class differences among each of values, included in the segmentation score map, corresponding to pixels of the respective lanes included in the input image is increased and (ii) each of intra-class variances of the values, included in the segmentation score map, corresponding to pixels included in the respective lanes included in the input image is decreased.

17. The computing device of claim 15, wherein, at the process of (I), the post-processing module generates the seed information by using (i) center coordinates corresponding to locations of the lane elements on the input image, (ii) widths of the lane elements, (iii) representative values, on the segmentation score map, of pixels included in the lane elements, and (iv) the clustering map, and
wherein the seed information includes at least one of clustering id values indicating at least one lane to which the lane elements belong.

18. The computing device of claim 15, wherein, at the process of (II), the post-processing module determines, as one of the lane anchors, a specific base model represented by a certain formula which approximately fits a straight line among the base models, wherein the certain formula is derived by referring to the center coordinates of the lane elements.

19. The computing device of claim 15, wherein, at the process of (II), the post-processing module determines a specific base model as one of the lane anchors, wherein the specific base model is selected among the base models by referring to specific lane elements (i) whose representative values on the segmentation score map are equal to or greater than a predetermined threshold value and (ii) whose clustering id values obtained by using the clustering map are similar.

20. The computing device of claim 15, wherein, at the process of (II), the post-processing module determines a specific base model as one of the lane anchors, wherein the specific base model is selected among the base models by referring to specific lane elements having the smallest variances of clustering id values on the seed information.

21. The computing device of claim 15, wherein, at the process of (III), the post-processing module traces and groups each of specific lane elements adjacent to each of the lane anchors, to thereby generate the lane blobs.

22. The computing device of claim 21, wherein the post-processing module traces and groups each of the specific lane elements adjacent to each of the lane anchors by referring to each of clustering id values, each of representative values, and each of widths on the seed information, corresponding to each of the lane anchors, to thereby generate the lane blobs.

23. The computing device of claim 22, wherein the post-processing module traces and groups the specific lane elements per each of the lane anchors bi-directionally along each of the lane anchors, to thereby generate the lane blobs.

24. The computing device of claim 15, wherein, at the process of (IV), the post-processing module (i) searches for and adds specific pixels, not included in the lane elements, among the pixels adjacent to the lane blobs, to thereby extend the lane blobs, and (ii) merges the extended lane blobs to thereby detect the lane candidates.

25. The computing device of claim 15, wherein, at the process of (IV), the post-processing module merges the lane blobs whose directionalities therebetween coincide with each other and clustering id values are within a predetermined range, to thereby detect the lane candidates.

26. The computing device of claim 15, wherein, at the process of (IV), if each directionality of each of the lane blobs and that of each of misunderstood groups are similar but each of corresponding clustering id values of each of the lane blobs and that of each of the misunderstood groups are not within a predetermined range, the post-processing module removes part having a lower average of values on the segmentation score map among the lane blobs and the misunderstood groups.

27. The computing device of claim 15, wherein, at the process of (IV), the line-fitting operation is an operation capable of outputting a polynomial model by polynomial fitting using a relation among center coordinates of the lane elements included in each of the lanes.

28. The computing device of claim 15, wherein, at the process of (IV), the line-fitting operation is an operation capable of outputting a spline model by selecting center locations of specific lane anchors with less errors during the tracing process, among the lane anchors, as key points of a spline.

* * * * *